(12) United States Patent
Kawamura

(10) Patent No.: US 8,975,857 B2
(45) Date of Patent: Mar. 10, 2015

(54) INVERTER APPARATUS AND INVERTER CONTROL METHOD

(75) Inventor: Hiromichi Kawamura, Yamato (JP)

(73) Assignee: Nissan Motor Co., Ltd., Yokohama (JP)

( * ) Notice: Subject to any disclaimer, the term of this patent is extended or adjusted under 35 U.S.C. 154(b) by 210 days.

(21) Appl. No.: 13/812,698

(22) PCT Filed: Aug. 29, 2011

(86) PCT No.: PCT/IB2011/001978
§ 371 (c)(1),
(2), (4) Date: Jan. 28, 2013

(87) PCT Pub. No.: WO2012/035385
PCT Pub. Date: Mar. 22, 2012

(65) Prior Publication Data
US 2013/0127383 A1 May 23, 2013

(30) Foreign Application Priority Data
Sep. 15, 2010 (JP) ................................. 2010-206775

(51) Int. Cl.
*H02P 27/04* (2006.01)
*H02P 6/14* (2006.01)
(Continued)

(52) U.S. Cl.
CPC ............. *H02P 6/14* (2013.01); *H02M 7/53875* (2013.01); *H02P 27/085* (2013.01); *H02P 21/0092* (2013.01); *H02P 29/0088* (2013.01); *H02P 3/22* (2013.01)
USPC .......................................... 318/801; 318/811

(58) Field of Classification Search
USPC .......... 318/727, 798, 799, 800, 801, 807, 811
See application file for complete search history.

(56) References Cited

U.S. PATENT DOCUMENTS 5,859,519 A * 1/1999 Archer ......................... 318/801
6,995,679 B2 * 2/2006 Eskritt et al. ............... 340/686.1
(Continued)

FOREIGN PATENT DOCUMENTS

DE 102006047692 A1 4/2008
JP 0947054 A 2/1997
(Continued)

OTHER PUBLICATIONS

An English translation of the Japanese Office Action for the corresponding Japanese patent application No. 2010-206775 issued on May 20, 2014.
(Continued)

*Primary Examiner* — Rina Duda
(74) *Attorney, Agent, or Firm* — Global IP Counselors, LLP

(57) ABSTRACT

An inverter apparatus basically includes an inverter, a rotational speed detecting component and a control component. The inverter includes a plurality of pairs of switching elements. The control component controls an on-off status of the switching elements to convert a direct current from a direct current power source into alternating current by alternately executing first and second controls when a rotational speed of a motor connected to the switching elements is larger than a prescribed rotational speed. The first control turns on the switching elements that are directly connected to a positive electrode of the power source, and turns off the switching elements that are directly connected to a negative electrode of the power source. The second control turns on the switching elements that are directly connected to the negative electrode and turns off the switching elements that are directly connected to the positive electrode.

20 Claims, 7 Drawing Sheets

(51) Int. Cl.
*H02P 27/08* (2006.01)
*H02P 21/00* (2006.01)
*H02P 29/00* (2006.01)
*H02P 3/22* (2006.01)
*H02M 7/5387* (2007.01)

(56) References Cited

U.S. PATENT DOCUMENTS

| | | | | |
|---|---|---|---|---|
| 7,180,256 | B2* | 2/2007 | Eskritt et al. | 318/400.14 |
| 7,202,622 | B2* | 4/2007 | Eskritt et al. | 318/400.24 |
| 7,723,938 | B2* | 5/2010 | Tsuji et al. | 318/432 |
| 2008/0129237 | A1* | 6/2008 | Atarashi et al. | 318/492 |
| 2011/0163706 | A1* | 7/2011 | Miura et al. | 318/400.27 |
| 2011/0285336 | A1* | 11/2011 | Fujita et al. | 318/400.27 |

FOREIGN PATENT DOCUMENTS

| | | |
|---|---|---|
| JP | 2005-39887 A | 2/2005 |
| JP | 2009-284747 A | 12/2009 |
| RU | 86810 U1 | 9/2009 |
| RU | 2397600 C1 | 8/2010 |
| RU | 2397601 C1 | 8/2010 |
| WO | 9705691 A1 | 2/1997 |

OTHER PUBLICATIONS

An English translation of the Russian Notice of Allowance for the corresponding Russian patent application No. 2013111530/07(017059) issued on Jul. 2, 2014.

The Mexican Office Action for the corresponding Mexican patent application No. Mx/a/2013/001563 issued on Oct. 18, 2013.

The International Search Report for the corresponding PCT International Application No. PCT/IB2011/001978 mailed on Aug. 8, 2013.

The European Office Action for the corresponding European patent application No. 11 768 102.3 issued on Apr. 3, 2014.

\* cited by examiner

INVERTER APPARATUS AND INVERTER CONTROL METHOD

CROSS-REFERENCE TO RELATED APPLICATIONS

This application is a U.S. National Stage of International Application No. PCT/IB2011/001978, filed Aug. 29, 2011. This application claims priority to Japanese Patent Application No. 2010-206775, filed on Sep. 15, 2010. The entire disclosure of Japanese Patent Application No. 2010-206775 is hereby incorporated herein by reference.

BACKGROUND

1. Field of the Invention

The present invention generally relates to an inverter apparatus and an inverter control method.

2. Background Information

A conventional motor drive apparatus can include an electric power storage device, an inverter circuit and a plurality of switching elements that are provided between the electric power storage device and the inverter circuit. The switching elements are operated by a controller to connect and disconnect a supply of electric power between the electric power storage device and a motor. On example of a conventional motor drive apparatus is disclosed in Japanese Laid-Open Patent Publication No. 2005-39887. In this publication, the motor drive apparatus enables an exchange of electric power between the electric power storage device and the motor. When a rotational speed of the motor is equal to or larger than a prescribed rotational speed, all of the switching elements of the inverter circuit that are connected to a positive electrode of the electric power storage device or all switching elements of the inverter circuit that are connected to a negative electrode of the electric power storage device are closed (in a conducting state). Meanwhile, when an electric current flowing to the switching elements goes to zero, the switching elements are put into a disconnected or non-conducting state.

SUMMARY

It has been discovered that with the conventional motor drive apparatus discussed above, when the rotational speed of the motor is equal to or larger than a prescribed rotational speed, control is executed such that either only all of the switching elements connected to a positive electrode of the electric power storage device, or only all of the switching elements connected to a negative electrode of the electric power storage device are closed. This control is executed until the current flowing to the switching elements goes to zero. Consequently, electric current flows to the switching elements in an unbalanced fashion and the service life of the switching elements is shortened.

One object of the present disclosure is to provide an inverter apparatus that enables a service life of the switching elements to be lengthened.

In view of the state of the known technology, one aspect of the present disclosure is to provide an inverter apparatus that basically comprises an inverter, a rotational speed detecting component and a control component. The inverter includes a plurality of pairs of switching elements. Each of the pairs of the switching elements is electrically connected to a direct current power. The rotational speed detecting component detects a rotational speed of a motor that is electrically connected to the pairs of the switching elements. The control component controls an on-off status of the switching elements to convert a direct current electric power from the direct current power source into alternating current electric power. The control component further alternately executes a first switching control and a second switching control upon detection of the rotational speed being larger than a prescribed rotational speed. The first switching control turns on all of the switching elements of the pairs of the switching elements connected to a positive electrode of the direct current electric power source, and turns off all of the switching elements of the pairs of the switching elements connected to a negative electrode of the direct current electric power source. The second switching control turns on all of the switching elements of the pairs of the switching elements connected to the negative electrode of the direct current electric power source and turns off all of the switching elements of the pairs of the switching elements connected to the positive electrode of the direct current electric power source.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
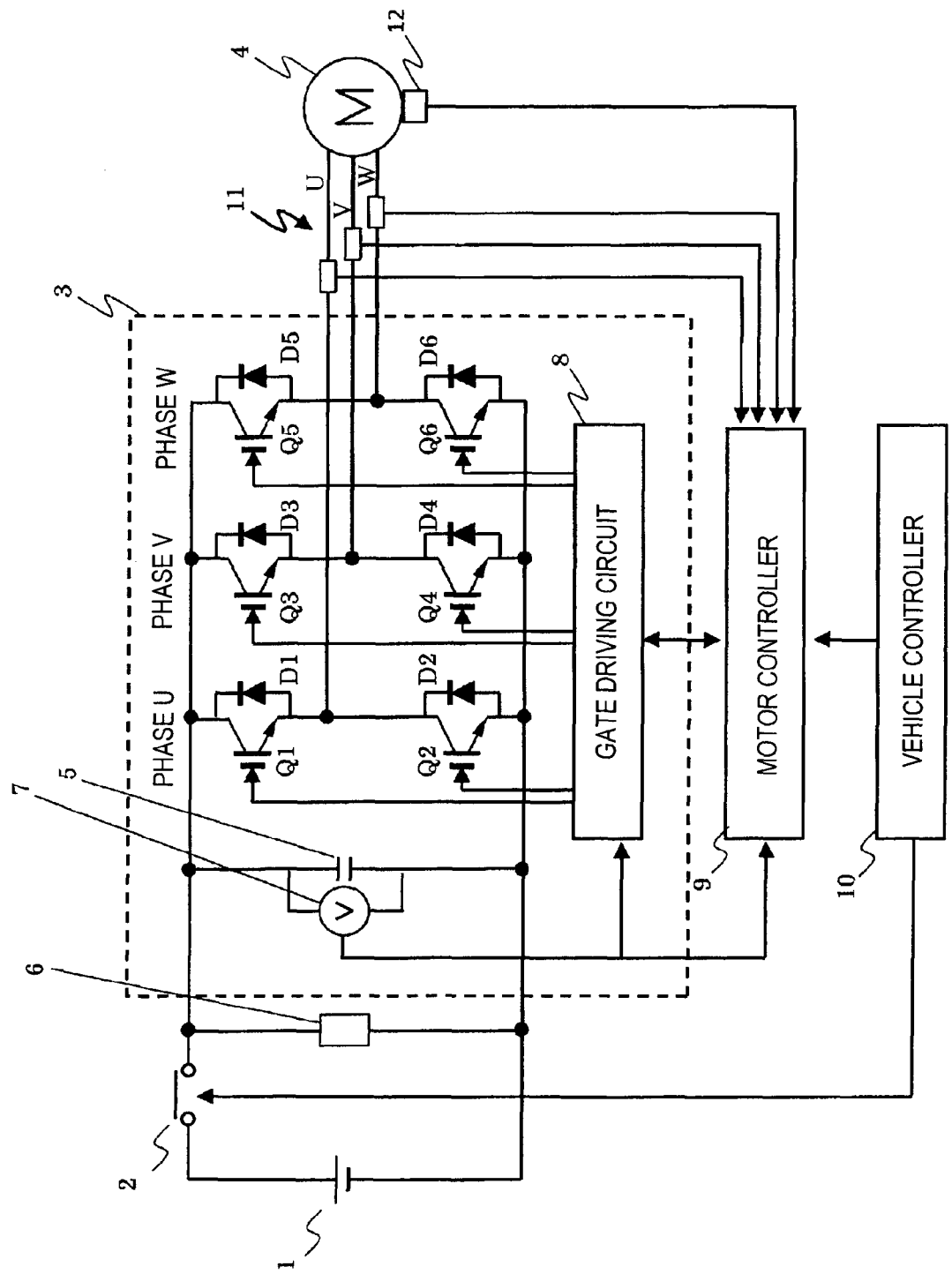
FIG. 1 is a block diagram of a drive power source apparatus that includes an inverter apparatus according to an embodiment.

Referring initially to FIG. 1, a drive power source apparatus is schematically illustrated for an electric vehicle that includes an inverter apparatus in accordance with a first embodiment. The electric vehicle of this embodiment includes, among other things, a battery 1, a relay 2, an inverter 3 and a permanent magnet motor 4. The inverter 3 includes a plurality of switching elements Q1 to Q6 (e.g., insulated gate bipolar transistors IGBT) and a plurality of rectifying elements D1 to D6 (e.g., diodes). With the inverter apparatus disclosed herein, the electric current flowing to the inverter 3 is distributed to substantially evenly among the switching elements Q1 to Q6. As a result, the electric current can be prevented from flowing to the switching elements Q1 to Q6 in an unbalanced manner and the service life of the switching elements Q1 to Q6 can be lengthened. Also as discussed below, the inverter 3 further includes a capacitor 5, a resistor 6, a voltage sensor 7 and a gate driving circuit 8.

Although a detailed drawing is not provided, the permanent magnet motor 4 of the electric vehicle in this illustrated embodiment operates on three-phase AC power that serves as a drive power source in a conventional manner. The motor 4 is connected to a wheel axle of the electric vehicle in a conventional manner to provide a driving force to one or more wheels. Although an electric vehicle will be used as an example, the inverter apparatus can also be applied to a hybrid vehicle (HEV).

In addition to the aforementioned components, the electric vehicle of this embodiment further includes a motor controller 9, a vehicle controller 10, a plurality of electric current sensors 11 and a rotor position sensor 12. The serves as an electric power source for the motor 4. The battery 1 is connected to the inverter 3 through the relay 2. The inverter 3 is configured to convert DC power from the battery 1 into AC power. The battery 1 includes, for example, a plurality of lithium ion batteries or another type of secondary battery. The relay 2 is opened and closed by the vehicle controller 11 in coordination with an on/off operation of an ignition key switch (not shown) of the vehicle. Specifically, the relay 2 is closed when the ignition key switch (not shown) is turned on, and the relay 2 is opened when the ignition key switch (not shown) is off.

The rectifying elements D1 to D6 are connected in parallel with each of the switching elements Q1 to Q6. The rectifying elements D1 to D6 are configured such that electric current flows therein in a direction opposite to a direction in which electric current flows in the switching elements Q1 to Q6. The inverter 3 converters DC power from the battery 1 into AC power and supplies the AC power to the motor 4. In this embodiment, three circuits comprising a pair of (two) switching elements connected in series are connected to the battery 1 in parallel to one another. Also each of the three input sections of the three-phase motor 4 is electrically connected between the two switching elements of a pair of the switching elements. The same type of switching element is used for all of the switching elements Q1 to Q6. For example, an insulated gate bipolar transistor (IGBT) can be used for each of the switching elements Q1 to Q6.

As shown in FIG. 1, in this illustrative embodiment, the switching elements Q1 and Q2 are connected together in series, the switching elements Q3 and Q4 are connected together in series, and the switching elements Q5 and Q6 are connected together in series. A phase U of the motor 4 is connected between the switching elements Q1 and Q2. A phase V of the motor 4 is connected between the switching elements Q3 and Q4. A phase W of the motor 4 is connected between the switching elements Q5 and Q6. The switching elements Q1, Q3 and Q5 are electrically connected to a positive electrode of the battery 1 and the switching elements Q2, Q4 and Q6 are electrically connected to a negative electrode of the battery 1. The on/off status of each of the switching elements Q1 to Q6 is controlled by the vehicle controller 10. The operation of the switching elements Q1 to Q6 executed by the vehicle controller 10 will be explained in more detail later.

In the inverter 3, the capacitor 5, the resistor 6, and the voltage sensor 7 are connected between the relay 2 and the switching elements Q1 to Q6. The capacitor 5 is provided to smooth the DC electric power supplied from the battery 1. The voltage sensor 7 serves to detect a voltage across the capacitor 5. The gate driving circuit 8 serves to send a gate signal to each of the switching elements Q1 to Q6 and turn the switching elements Q1 to Q6 on and off. The gate driving circuit 8 detects overheating and overcurrent abnormalities in the switching elements Q1 to Q6. Based on these detections, the gate driving circuit 8 sends an abnormality signal to the motor controller 9. The gate driving circuit 8 also receives a signal from the voltage sensor 7, and converts the signal to a waveform level that can be recognized by the motor controller 9 before sending the signal to the motor controller 9 as a signal indicating a voltage of the capacitor 5.

The motor controller 9 controls the inverter 3 and the operation of the motor 4. The motor controller 9 constitutes to a control component component or means. The motor controller 9 receives a signal indicating a torque command value (T*) issued from the vehicle controller 10, a signal from the rotor positioning sensor 12, feedback signals from the electric current sensors 11, and a signal from the voltage sensor 7. The motor controller 9 generates a PWM (pulse width modulation) signal in accordance with the signals received from theses sensors and the vehicle controller 10. The motor controller 9 sends the PWM signal to the gate driving circuit 8. The gate driving circuit 8 turns the switching elements Q1 to Q6 on and off at a prescribed timing based on the pulse width modulation signal.

The vehicle controller 10 includes a central processing unit (CPU), a read only memory (ROM), and a random access memory (RAM). The vehicle controller 10 serves as a control section for controlling the entire vehicle in this embodiment. The vehicle controller 10 calculates a torque command value (T*) based on an accelerator signal, a brake signal, and a shift position signal and sends the torque command value (T*) to the motor controller 9. The vehicle controller 10 also sends a start request command to the motor controller 9 upon determining the vehicle will be driven, and sends a stop request command to the motor controller 9 upon determining the vehicle will be stopped. The vehicle controller 10 also sends open/close status information regarding the relay 2 to the motor controller 9.

The electric current sensors 11 are arranged between the inverter 3 and the motor with respect to each of the respective phases of the motor 4. The electric current sensors 11 serve to detect the electric currents (Iu, Iv, and Iw) supplied to each of the phases of the motor 4 from the inverter 3. The electric current sensors 11 send signals indicating the detected electric currents to the motor controller 9. The rotor position sensor 12 is a resolver, encoder, or other sensor device that is provided on the motor 4 and serves to detect a position of a rotor of the motor 4. The rotor position sensor 12 sends a detected position of the rotor to the motor controller 9.

Figure 2:
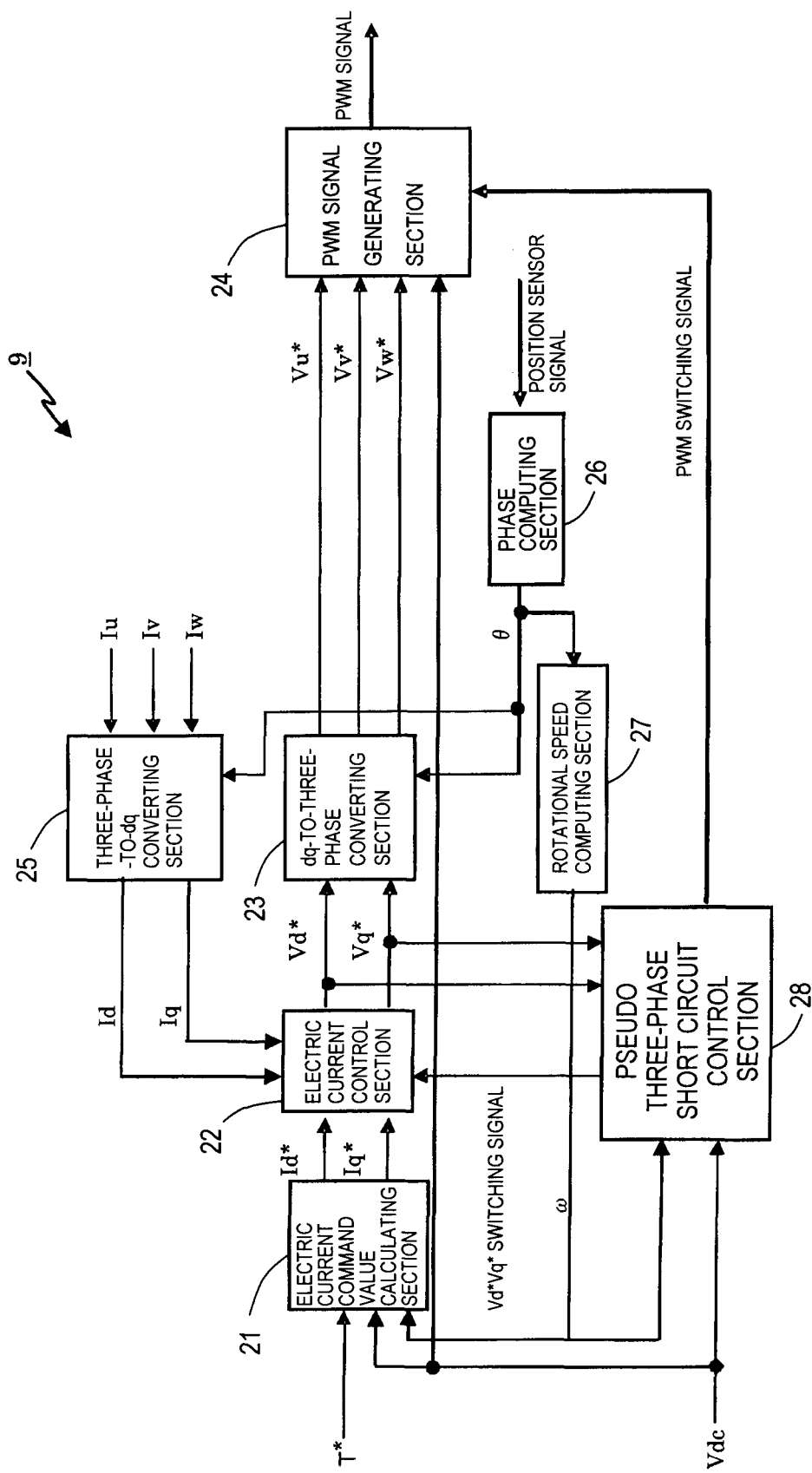
FIG. 2 is a block diagram of the motor controller shown in FIG. 1.

Constituent features of the motor controller 9 will now be explained in more detail with reference to FIG. 2. FIG. 2 is a block diagram of the motor controller 9 included in the inverter apparatus according to this embodiment. As shown in FIG. 2, the motor controller 9 comprises an electric current command value calculating section 21, an electric current control section 22, a dq-to-three-phase converting section 23, a PWM signal generating section 24, a three-phase-to-dq converting section 25, a phase computing section 26, a rotational speed computing section 27, and a pseudo three-phase short circuit control section 28. The rotor position sensor 12, the phase computing section 26 and the rotational speed computing section 27 constitute to a rotational speed detecting component or means.

The electric current command value calculating section 21 receives the torque command value (T*), an angular velocity ($\omega$) of the motor 8 calculated by the rotational speed computing section 27, and a detected voltage ($V_{dc}$) of the capacitor 5 detected by the voltage sensor 7. The electric current command value calculating section 21 refers to a map to calculate a pair of dq axis electric current command values (i*d, i*q) indicating a target value of an alternating current supplied to the motor 4 from the inverter 3. The map uses the torque command value (T*), the angular velocity (ω), and the voltage ($V_{dc}$) as indices. The map is stored in the electric current command value calculating section 21 in advance for determining the dq axis electric current command values (i*d, i*q). The map is configured to output an optimum command value for minimizing a loss of the inverter 3 and a loss of the motor 4 for a given set of input. The d and q axis values indicate coordinates in a polar coordinate system.

The electric current control section 22 receives the dq axis electric current command values (i*d, i*q) and a pair of dq axis electric currents (id, iq) outputted from the three-phase-to-dq converting section 25 and computes a pair of dq axis voltage command values (V*d, V*q). The electric current control section 22 also sets the dq axis voltage command values (V*d, V*q) to zero when it receives a Vd*Vq* switching signal from the pseudo three-phase short circuit control section 28.

The dq-to-three-phase converting section 23 receives the dq axis voltage command values (V*d, V*q) and a phase detection value (θ) from the phase computing section 26 and converts the dq axis voltage command values (V*d, V*q) in a polar coordinate system to a set of voltage command values (V*u, V*v, V*w) in a fixed coordinate system having a u-axis, a v-axis and a w-axis. The dq-to-three-phase converting section 23 outputs the voltage command values (V*u, V*v, V*w) resulting from the conversion to the PWM signal generating section 24.

The PWM signal generating section 24 generates a PWM signal for controlling switching of the switching elements Q1 to Q6 based on the detected voltage (Vdc) of the capacitor 5 and the voltage command values (V*u, V*v, V*w) and sends the PWM signal to the inverter 3. When the PWM signal generating section 24 receives a PWM switching signal from the pseudo three-phase short circuit control section 28, the PWM signal generating section 24 sends the PWM signal shown in FIG. 4 (explained later).

The three-phase-to-dq converting section 25 is a control section serving to convert from three-phase to two-phase. It receives phase currents ($i_u$, $i_v$, and $i_w$) and a detected phase value (θ) from the phase computing section 26 and converts the phase currents ($i_u$, $i_v$, $i_w$) indicated in fixed coordinates to phase currents ($i_d$, $i_q$) indicated in polar coordinates. The three-phase-to-dq converting section 25 also sends the phase currents (id, iq) indicated in polar coordinates resulting from the conversion to the electric current control section 22.

The phase computing section 26 computes a phase (θ) of the rotor based on a signal from the rotor position sensor 12 indicating a position of the rotor of the motor 4 sent and sends the computed phase (θ) to the dq-to-three-phase converting section 23, the three-phase-to-dq converting section 25, and the rotational speed computing section 27. The rotational speed computing section 27 computes a rotational speed (electricity angular velocity) (ω) by differentiating the phase (θ) and sends the computed angular velocity to the electric current command value calculating section 21 and the pseudo short circuit control section 28.

The pseudo three-phase short circuit control section 28 determines whether to electrically disconnect the motor 4 from the battery 1 (DC power source) based on the detected voltage (Vdc) of the capacitor 5, the dq axis voltage command values (V*d, V*q), and the rotational speed (ω). Based on a determination result, the pseudo three-phase short circuit control section 28 generates a Vd*-Vq* switching signal and a PWM switching signal and sends the Vd*-Vq* switching signal to the electric current control section 22 and the PWM switching signal to the PWM signal generating section 24.

During a torque control of the motor 4, there is a possibility that the rotational speed of the motor 4 will increase to a point where the output voltage of the inverter reaches a saturation level and an appropriate electric current target value cannot be set. When this occurs, the control of the torque command value becomes unstable and there is a possibility that the behavior of the vehicle will become unstable.

In this embodiment, as will now be explained, a control is executed to suppress the rotational speed of the motor 4 to a rotational speed equal to or smaller than a prescribed threshold value when the rotational speed of the motor 4 has exceeded the prescribed threshold value. Furthermore, in order to prevent the electric current flowing in the inverter 3 from being concentrated in certain switching elements among the switching elements Q1 to Q6 during the rotational speed suppressing control, the pseudo three-phase short circuit control section 28 executes a control to distribute the electric current flowing to the inverter 3 among switching elements Q1 to Q6.

Figure 3:
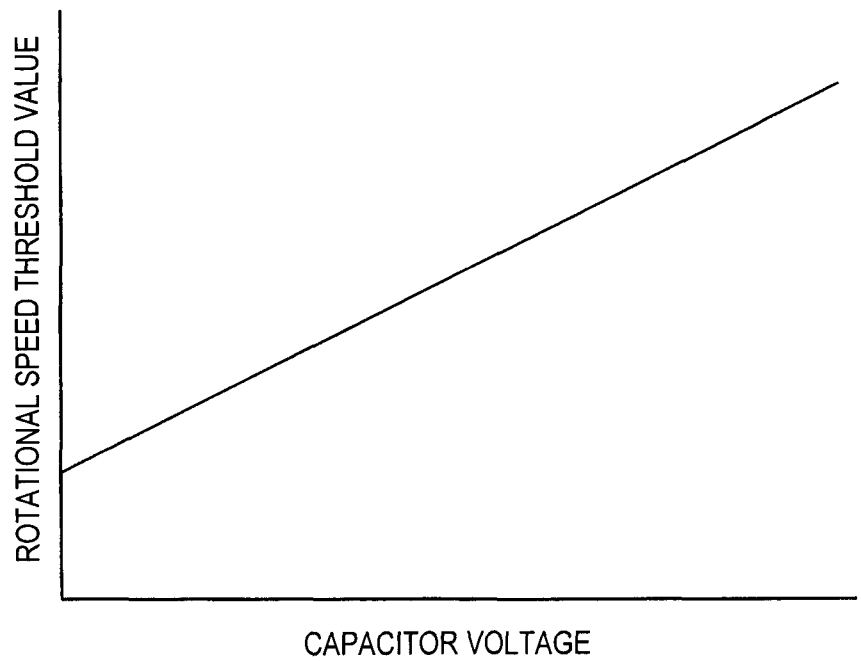
FIG. 3 is a graph showing a rotational speed threshold value versus a voltage characteristic for a capacitor shown in FIG. 1.
Figure 4:
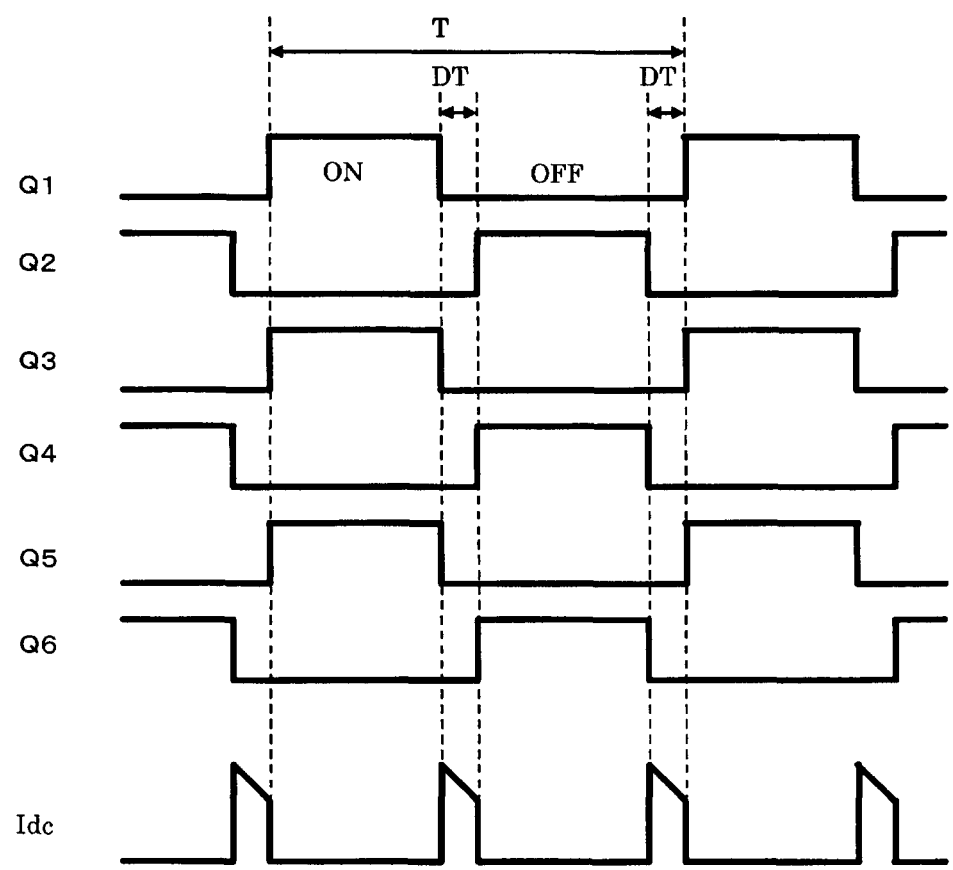
FIG. 4 is a graph showing time characteristics of individual gate drive signals of the switching elements and a time characteristic of an electric current flowing from the inverter toward a battery.
Figure 5:
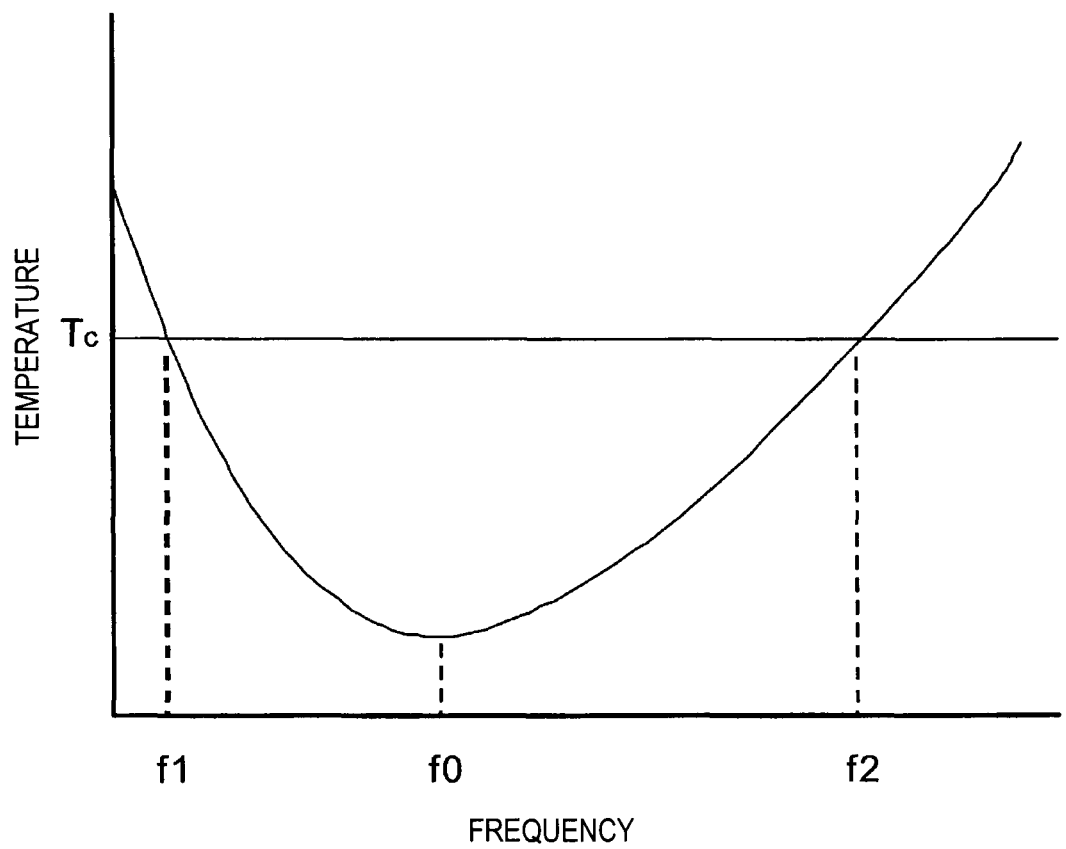
FIG. 5 is a graph showing a temperature versus gate drive signal frequency characteristic for the switching elements.

The control of the inverter apparatus according to this embodiment will now be explained using FIGS. 3 to 5. FIG. 3 is a graph showing a rotational speed threshold value versus voltage characteristic for the capacitor 5. FIG. 4 is a graph showing time characteristics of individual gate drive signals of the switching elements Q1 to Q6 and a time characteristic of an electric current flowing from the inverter 3 toward a battery 1. FIG. 5 is a graph showing a temperature versus gate drive signal frequency characteristic for the switching elements Q1 to Q6.

The pseudo three-phase short circuit control section 28 has a rotational speed threshold value (ωc) set therein as a threshold value for determining a control state of the inverter 3. If a rotational speed of the motor 4 is large, then a back voltage induced by the motor 4 becomes large. Meanwhile, if a voltage of the capacitor is low, then control becomes unstable. Therefore, when the rotational speed (ω) computed by the rotational speed computing section 27 becomes higher than the rotational speed threshold value (ωc), the pseudo three-phase short circuit control section 28 determines that there is a possibility of control instability.

The pseudo three-phase control section 28 sets the rotational speed threshold value (ωc) based on the detected voltage (Vdc) across the capacitor 5. Even if the back voltage induced by the motor 4 is high, the voltage difference between the input and output sides of the inverter 3 will be small and the control state of the inverter 3 will be stable if the detected voltage (Vdc) of the capacitor 5 is high. Therefore, the rotational speed threshold value (ωc) is set to a large value when the detected voltage (Vdc) of the capacitor 5 is high, and the rotational speed threshold value (ωc) is set to a small value when the detected voltage (Vdc) of the capacitor 5 is low. Thus, as shown in FIG. 3, the rotational speed threshold value (we) is proportional to the detected voltage of the capacitor 5 and the pseudo three-phase short circuit control section 28 sets the rotational speed threshold value (ωc) to be larger in accordance with higher detected voltages (Vdc) of the capacitor 5.

In addition to determining a control state based on the rotational speed (ω), the pseudo three-phase short circuit control section 28 determines a control state based on a percentage modulation of the inverter 3. The pseudo three-phase short circuit control section 28 first calculates a percentage modulation (M) based on a voltage (Vdc) detected by the voltage sensor 7 and a dq axis voltage command values (V*d, V*q) from the electric current control section 22 using the equation (1) shown below.

$$M = \frac{\sqrt{2}\sqrt{V_d^{*2} + V_q^{*2}}}{V_{dc}} \quad (1)$$

The percentage modulation (M) indicates a ratio of a voltage supplied to the motor 4 to a DC voltage of the battery 1. It is known that when the percentage modulation (M) exceeds 1, the waveform of the voltage supplied to the motor 4 is not sinusoidal but, instead, is distorted.

The pseudo three-phase short circuit control section 28 sets a prescribed percentage modulation threshold value (Mc) for determining a control state of the inverter 3. The pseudo three-phase short circuit control section 28 determines that the control state could be unstable if the calculated percentage modulation (M) is higher than the percentage modulation threshold value (Mc).

When the rotational speed (ω) is larger than the rotational speed threshold value (ωc) and the percentage modulation M is higher than the percentage modulation threshold value (Mc), the pseudo three-phase short circuit 28 transmits a Vd*Vq* switching signal to the electric current control section 22 and executes a control to make the dq axis voltage command values (V*d, V*q) converge to zero. When the electric current control section 22 receives the Vd*Vq* switching signal, the electric current control section 22 stops following the received electric current command values (i*d, i*q) and dq axis electric currents (id, iq) and gradually transitions the dq axis voltage command values (V*d, V*q) to zero. An example of a method of gradually transitioning the dq axis voltage command values (V*d, V*q) to zero is to apply a low-pass filter processing to the voltage command value using a dq axis voltage command values (V*d, V*q) existing immediately before the Vd*Vq* switching signal was received.

When the dq axis voltage command values (V*d, V*q has converged to zero, the pseudo three-phase short circuit control section 28 sends a PWM switching signal to the PWM signal generating section 24 and executes a control such that an electric current resulting from a regenerative control of the motor 4 is prevented flowing to only certain switching elements among the switching elements Q1 to Q6 in an unbalanced manner.

When the PWM signal generating section 24 receives the PWM switching signal, the PWM signal generating section 24 alternately executes a control to turn the switching elements Q1, Q3 and Q5 connected to the positive side of the battery 1 on and turn the switching elements Q2, Q4 and Q6 connected to the negative side of the battery 1 off (hereinafter called a "first switching control") and a control to turn the switching elements Q2, Q4 and Q6 on and turn the switching elements Q1, Q3 and Q5 off (hereinafter called a "second switching control").

Thus, as shown in FIG. 3, the periods during which the switching elements Q1, Q3 and Q5 are on and the periods during which the switching elements Q2, Q4 and Q6 are on do not overlap. The switching elements Q2, Q4 and Q6 are turned off during the periods when the switching elements Q1, Q3 and Q5 are on, and the switching elements Q1, Q3 and Q5 are turned off during the periods when the switching elements Q2, Q4 and Q6 are on. In FIG. 4, the term T is a period of a gate driving signal and the term DT is a dead time. The cycle period at which each of the switching elements Q1 to Q6 is turned on and off is the same and the phase difference is zero. Dead times (DT) during which all of the switching elements Q1 to Q6 are off are provided between respective on periods and off periods of the switching elements Q1 to Q6. Thus, the length of the periods during which the first switching control is executed to turn the switching elements Q1, Q3 and Q5 on and turn the switching elements Q2, Q4 and Q6 off equal the length of the periods during which the second switching control is executed to turn the switching elements Q2, Q4 and Q6 on and turn the switching elements Q1, Q3 and Q5 off. Also dead times are provided between executions of the first switching control and executions of the second switching control.

A reflux current caused by a voltage induced by the motor 4 flows between the motor 4 and the inverter 3 during the periods when the switching elements Q1, Q3 and Q5 are on and the periods when the switching elements Q2, Q4 and Q6 are on, i.e., during periods other than during the dead times. As shown in FIG. 3, the reflux current flows from the inverter 3 to the battery 1, and acts as a regenerative electric current (Idc) during the dead times. When the reflux electric current flows through the inverter 3, the reflux electric current either flows through the switching elements Q1, Q3 and Q5 and not through the switching elements Q2, Q4 and Q6 or flows through the switching elements Q2, Q4 and Q6 and not through the switching elements Q1, Q3 and Q5. As a result, the reflux current does not flow through only certain switching elements in an unbalanced manner and, instead, can be distributed to all of the switching elements Q1 to Q6.

The PWM signal generating section 24 receives a PWM switching signal and sets a frequency at which the switching elements Q1 to Q6 are turned on and off (hereinafter called "switching frequency") during the control of the switching elements Q1 to Q6. As shown in FIG. 5, the switching frequency is set to a frequency lying within a range spanning from a frequency f1 to a frequency f2. The switching frequency corresponds to a frequency at which the inverter 3 repeatedly switches between a state in which the switching elements Q1, Q3 and Q5 are turned on simultaneously and a state in which the switching elements Q2, Q4 and Q6 are turned on simultaneously.

As shown in FIG. 5, the characteristic curve of the temperature of the switching elements Q1 to Q6 has a minima at a switching frequency f0. If the switching frequency increases from the switching frequency f0, then the temperature of the switching elements Q1 to Q6 will increase because a switching loss increases as the switching frequency increases. Meanwhile, if the switching frequency decreases from the switching frequency f0, then the switching loss is substantially zero and the conduction loss increases. When the switching frequency decreases, the temperature of the switching elements Q1 to Q6 pulsates and the amplitude of the pulsation increases the more the switching frequency decreases. Consequently, the temperature of the switching elements Q1 to Q6 increases as the switching frequency decreases from the switching frequency f0.

In FIG. 5, the switching element temperature Tc corresponding to the switching frequency f1 and the switching frequency f2 is an allowable temperature at which the switching elements Q1 to Q6 can be ensured to operate properly. Consequently, in this embodiment, the PWM signal generating section 24 is configured to set the switching frequency to a frequency between the frequency f1 and the frequency f2 to prevent the temperature of the switching elements Q1 to Q6 from exceeding the allowable temperature and an over-heated state from being reached.

As explained above, the when the rotational speed of the motor 4 becomes larger than the rotational speed threshold value, the motor controller 9 executes a first switching control and a second switching control alternately with respect to the switching elements Q1 to Q6. Meanwhile, when the rotational speed of the motor 4 becomes equal to or smaller than the rotational speed threshold value, the motor controller 9 sets an electric current target value with respect to a torque command value or other external input and generates a PWM signal with respect to the switching elements Q1 to Q6 based on the electric current target value. In this way, the motor controller 9 changes over to a normal or regular switching control with respect to the switching elements Q1 to Q6.

Figure 6:
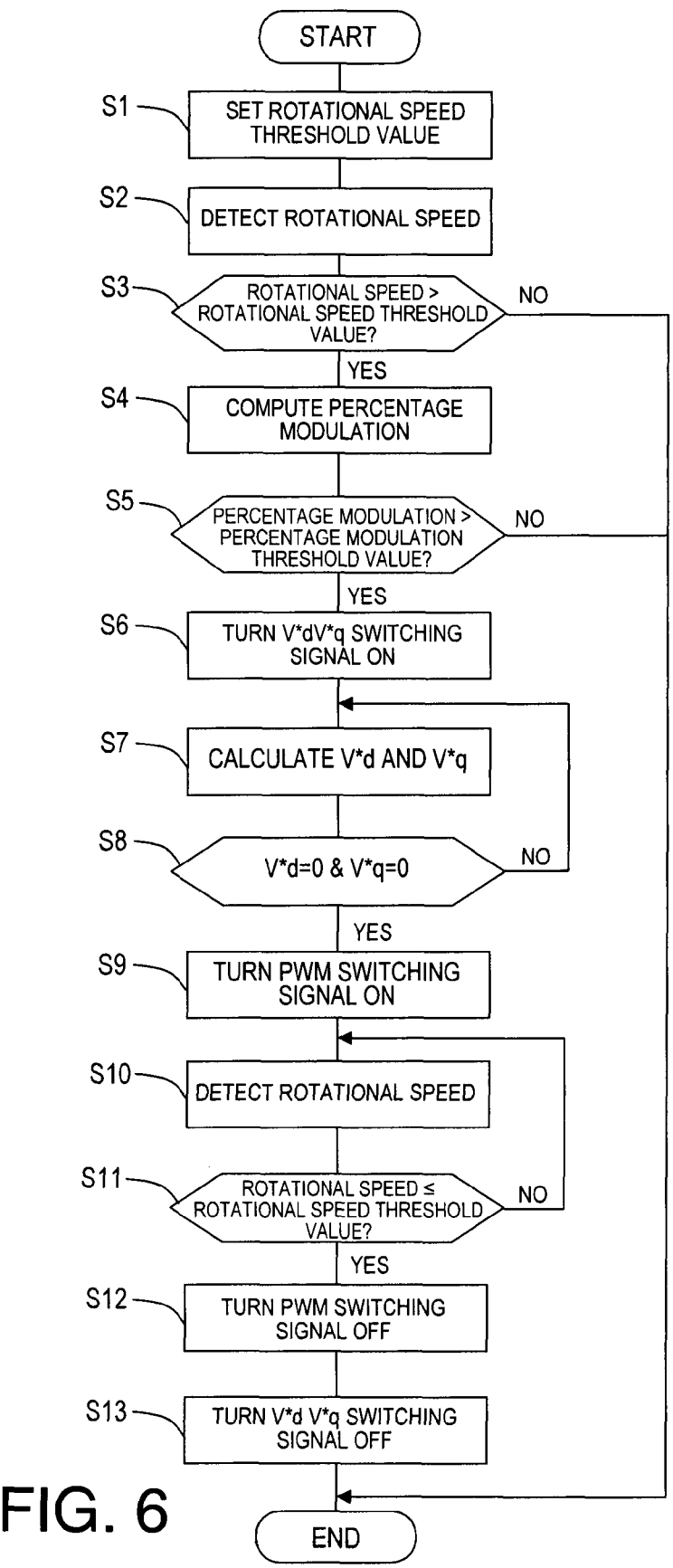
FIG. 6 is a flowchart showing a control procedure of the inverter apparatus shown in FIG. 1.

A control procedure executed by the inverter apparatus according to this embodiment will now be explained using FIGS. 1, 2 and 6. FIG. 6 is a flowchart showing a control procedure of the inverter apparatus according to this embodiment.

In step S1, the motor controller 9 uses the characteristic shown in FIG. 3 to set the rotational speed threshold value ($\omega c$) based on a voltage detected by the voltage sensor 7. In step S2, the motor controller 9 detects a rotational speed of the motor 4 based on a signal from the rotor position sensor 12. In step S3, the motor controller 9 compares a detected rotational speed to the rotational speed threshold value ($\omega c$). If the rotational speed ($\omega$) is equal to or smaller than the rotational speed threshold value ($\omega c$), then the control processing is ended. Meanwhile, if the rotational speed ($\omega$) is larger than the rotational speed threshold value ($\omega c$), then the motor controller 9 proceeds to step S4.

In step S4, the motor controller 9 uses the equation 1 to compute a percentage modulation (M) based on the voltage detected by the voltage sensor 7 and the dq axis voltage command values (V*d, V*q) from the electric current control section 22. In step S5, the motor controller 9 compares the percentage modulation (M) to the percentage modulation threshold value (Mc). If the percentage modulation (M) is equal to or smaller than the percentage modulation threshold value (Mc), then the control processing is ended. Meanwhile, if the percentage modulation (M) is larger than the percentage modulation threshold value (Mc), then the motor controller 9 proceeds to step S6.

In step S6, the motor controller 9 turns the Vd*Vq* switching signal of the pseudo three-phase short circuit control section 28 on. The pseudo three-phase short circuit control section 28 sends the Vd*Vq* switching signal to the electric current control section 22 and makes the dq axis voltage command values (V*d, V*q) converge toward zero. When the motor controller 9 is making the dq axis voltage command values (V*d, V*q) converge toward zero, the motor controller 9 calculates the dq axis voltage command values (V*d, V*q) (step S7) and determines if the dq axis voltage command values (V*d, V*q) has reached zero (step S8). If the d-q voltage command values (V*d, V*q) have not reached zero, the motor controller 9 returns to step S7. If the dq axis voltage command values (V*d, V*q) have reached zero, the motor controller 9 proceeds to step S9.

In step S9, the motor controller 9 turns the PWM switching signal of the pseudo three-phase short circuit control section 28 on. The pseudo three-phase short circuit control section 28 sends the PWM switching signal to the electric current control section 22 and executes the first switching control and the second switching control with respect to the switching elements Q1 to Q6 in an alternating fashion.

The motor controller 9 detects a rotational speed of the motor 4 based on a signal from the rotor position sensor 12 (step S10) and compares the detected rotational speed to the rotational speed threshold value ($\omega c$) (step S11). If the rotational speed ($\omega$) is larger than the rotational speed threshold value ($\omega c$), then the motor controller returns to step S10. If the rotational speed ($\omega$) is equal to or smaller than the rotational speed threshold value ($\omega c$), then the motor controller proceeds to step S12.

The motor controller 9 turns the PWM switching signal of the pseudo three-phase short circuit control section 28 off (step S12), turns the Vd*Vq* switching signal of the pseudo three-phase short circuit control section 28 off, and returns to a regular (normal) switching control by ending the control sequence.

As explained above, in this embodiment, the first switching control and the second switching control are executed alternately when the rotational speed ($\omega$) is larger than the rotational speed threshold value ($\omega c$). As a result, the rotational speed of the motor 4 can be suppressed and the current flowing in the inverter 3 can be distributed to the switching elements Q1 to Q6 evenly. Thus, a situation in which only certain switching elements among the switching elements Q1 to Q6 reach a high temperature and incur large switching losses can be prevented. As a result, control of the inverter 3 can be stabilized and the service life of the switching elements Q1 to Q6 can be lengthened.

In this embodiment, the higher the voltage of the battery 1 becomes, the larger the value to which the rotational speed threshold value ($\omega c$) is set. As a result, the inverter can be controlled over a wide range of rotational speeds in accordance with the voltage of the battery 1.

In this embodiment, in addition to the condition related to the rotational speed of the motor 4, a state in which the percent modulation (M) is higher than the percent modulation threshold value (Mc) is also used as a condition for executing the first switching control and the second switching control. As a result, regular (normal) control of the inverter 3 can be executed up to a limit where the control diverges and the range over which the inverter 3 can be driven in a stable manner can be expanded.

In this embodiment, the motor controller 9 switches from alternating execution of the first switching control and the second switching control to the regular (normal) control when the rotational speed ($\omega$) of the motor 4 becomes equal to or smaller than the rotational speed threshold value ($\omega c$). Thus, since the regular (normal) control is resumed when the rotational speed ($\omega$) of the motor 4 decreases, the inverter system of this embodiment can continue operating without shutting down. As a result, a vehicle in which an inverter apparatus according to this embodiment is installed can continue moving.

In this embodiment, during the first switching control and the second switching control, the switching frequency is set within a range spanning from a frequency f1 and a frequency f2 such that the temperatures of the switching elements Q1 to Q6 stay within an allowable temperature range. As a result, the switching elements Q1 to Q6 can be prevented from reaching an excessive temperature.

Although in the embodiment the switching frequency is set within a range spanning from a frequency f1 and a frequency 12, it is acceptable to set the switching frequency to the frequency f0 shown in FIG. 5. As a result, the switching elements Q1 to Q6 can be prevented from reaching an excessive temperature.

In this embodiment, it is acceptable to set the switching frequency to a frequency lower than the switching frequency used during regular (normal) control when the rotational speed is equal to or below the rotational speed threshold value ($\omega c$). As a method of setting the switching frequency to a frequency lower than the frequency used during regular (normal) control, it is acceptable to use a common method in which an interrupt cycle period for PWM control executed by the central processing unit CPU of the motor controller 9 is lengthened. Or, in the interest of safety when a fault is detected, the interrupt cycle period can be left at the normal period and switching with a longer period can be accomplished using an internal counter. In the latter method, the dq axis voltage command values (Vd*Vq*) is ignored and switching is not executed according to the values Vd*=Vq*=0. Instead, a control is executed such that highside switching elements are operated with a simultaneous-ON duty of 100% and low-side switching elements are operated with a simultaneous-ON duty of 0% repeatedly for a prescribed amount of time. In this way, the ratio of the dead time to the period T is decreased and the regenerative electric power going to the battery 1 is reduced so that the overcharging of the battery 1 can be prevented. Also, switching losses of the switching elements Q1 to Q6 can be reduced and the efficiency of the inverter 3 can be improved.

In this embodiment, it is acceptable to set the switching frequency such that the electric power supplied from the motor 4 to the inverter 3 due to regeneration control of the motor 4 is equal to the electric power lost at the inverter 3. The loss at the inverter 3 includes losses caused by internal resistances in the switching elements Q1 to Q6 and the diodes D1 to D6 and a loss resulting from the resistor 6.

Figure 7:
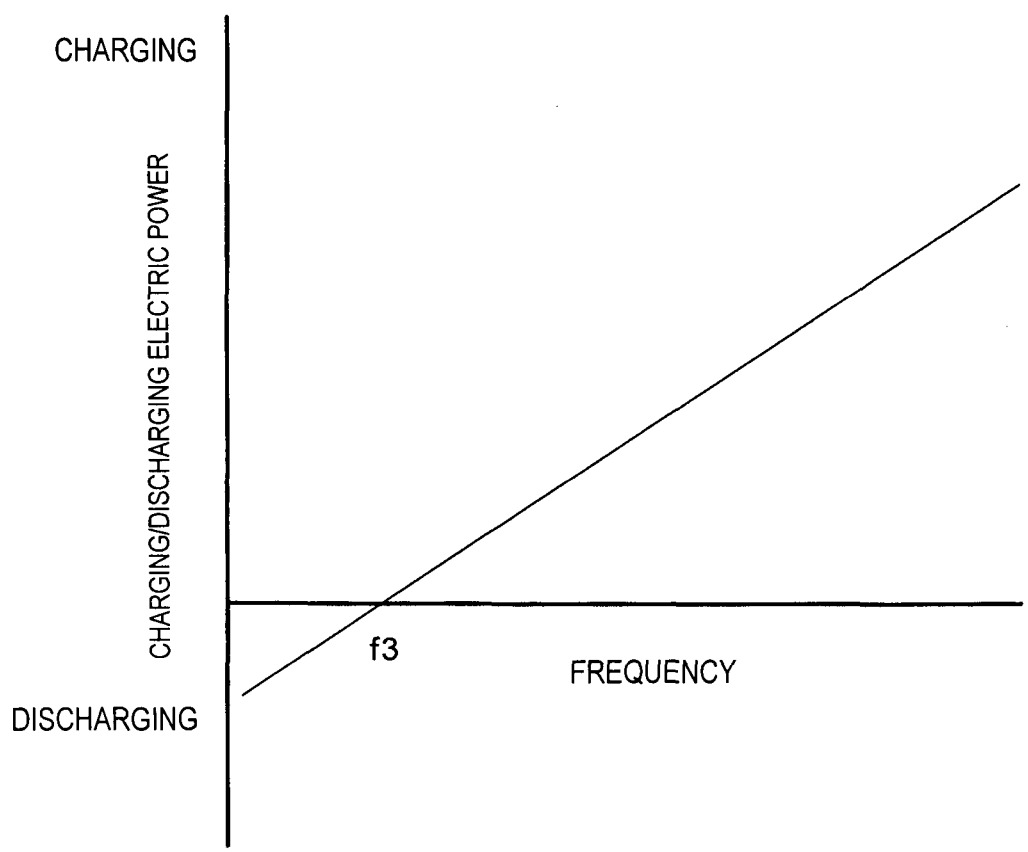
FIG. 7 is a graph showing a battery charging/discharging power versus switching frequency characteristic for the inverter apparatus shown in FIG. 1.

The frequency set in such a case will now be explained with reference to FIG. 7. FIG. 7 is a graph of a battery 1 charging/discharging power versus switching frequency characteristic in which the positive side of the vertical axis indicates charging and the negative side indicates discharging. The charging/discharging power of the battery 1 indicates an electric power going from the inverter 3 to the battery 1. This electric power follows a trend in which a charging electric power amount increases as the frequency increases and a discharging electric power amount increases as the frequency decreases. The charging/discharging power of the battery 1 is a sum of a steady state discharging electric power caused by the resistor 6 and a charging electric power caused by a regenerative state occurring during dead time periods during switching of the inverter. The charging electric power resulting from regeneration is smaller when the switching frequency is lower and goes to 0 if switching is not executed. Consequently, the charging/discharging electric power follows a characteristic of increasing proportionally to the switching frequency.

The motor controller 9 sets the switching frequency to a frequency f3 (see FIG. 7) such that the electric power supplied to the inverter 3 from the motor 4 equals the electric power loss occurring in the inverter and the charging/discharging electric power goes to zero. As a result, the battery 1 and the inverter 3 can be electrically separated from each other and the battery 1 can be prevented from undergoing excessive charging or excessive discharging.

In this embodiment, it is also acceptable to avoid an audible frequency range (approximately 10 Hz to 20 kHz) when setting the switching frequency. In this way, passengers and other persons in a region surrounding the vehicle can be protected from experiencing an unpleasant noise.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. An inverter apparatus comprising:
   an inverter including a plurality of pairs of switching elements, each of the pairs of the switching elements being electrically connected to a direct current power source;
   a rotational speed detecting component that detects a rotational speed of a motor that is electrically connected to the pairs of the switching elements; and
   a control component that controls an on-off status of the switching elements to convert a direct current electric power from the direct current power source into alternating current electric power,
   the control component further alternately executing a first switching control and a second switching control during a period in which the rotational speed is detected as being larger than a prescribed rotational speed,
   the first switching control turning on all of the switching elements of the pairs of the switching elements connected to a positive electrode of the direct current electric power source and turning off all of the switching elements of the pairs of the switching elements connected to a negative electrode of the direct current electric power source, and
   the second switching control turning on all of the switching elements of the pairs of the switching elements connected to the negative electrode of the direct current electric power source and turning off all of the switching elements of the pairs of the switching elements connected to the positive electrode of the direct current electric power source.

2. The inverter apparatus according to claim 1, wherein the control component controls the switching elements such that a time period during which the first switching control is executed equals a time period during which the second switching control is executed.

3. The inverter apparatus according to claim 1, wherein the control component alternately executes the first and second switching controls upon determining a percentage modulation, which indicates a ratio of voltage supplied to the motor with respect to a direct current voltage of the direct current power source, is higher than a prescribed percentage modulation.

4. The inverter apparatus according to claim 1, wherein the control component transitions from a control alternately executing the first and second switching controls to a regular switching control upon detecting the rotational speed has become smaller than the prescribed rotational speed.

5. The inverter apparatus according to claim 1, wherein the control component sets a frequency at which the switching elements are turned on and off during alternate execution of the first and second switching controls to a lower frequency than a frequency at which the switching elements are turned on and off upon detecting the rotational speed is equal to or smaller than the prescribed rotational speed.

6. The inverter apparatus according to claim 1, wherein the control component sets a frequency at which the switching elements are turned on and off during alternate execution of the first and second switching controls such that a temperature of the switching elements lies within a prescribed allowable temperature range.

7. The inverter apparatus according to claim 6, wherein the control component sets the frequency such that the temperature of the switching elements equals a lowest temperature of the prescribed allowable temperature range.

8. The inverter apparatus according to claim 1, wherein
the control component sets a frequency at which the switching elements are turned on and off during alternate execution of the first and second switching controls such that electric power supplied to the inverter from the motor due to a regeneration control of the motor to charge a battery equals an electric power lost in the inverter.

9. The inverter apparatus according to claim 1, wherein
the control component sets a frequency at which the switching elements are turned on and off during alternate execution of the first and second switching controls such that an audible frequency region is avoided.

10. The inverter apparatus according to claim 2, wherein
the control component sets the prescribed rotational speed such that as voltage of the direct current power source becomes higher, a value to which the prescribed rotational speed is set becomes larger.

11. The inverter apparatus according to claim 2, wherein
the control component alternately executes the first and second switching controls upon determining a percentage modulation, which indicates a ratio of voltage supplied to the motor with respect to a direct current voltage of the direct current power source, is higher than a prescribed percentage modulation.

12. The inverter apparatus according to claim 2, wherein
the control component transitions from a control alternately executing the first and second switching controls to a regular switching control upon detecting the rotational speed has become smaller than the prescribed rotational speed.

13. The inverter apparatus according to claim 2, wherein
the control component sets a frequency at which the switching elements are turned on and off during alternate execution of the first and second switching controls to a lower frequency than a frequency at which the switching elements are turned on and off upon detecting the rotational speed is equal to or smaller than the prescribed rotational speed.

14. The inverter apparatus according to claim 2, wherein
the control component sets a frequency at which the switching elements are turned on and off during alternate execution of the first and second switching controls such that a temperature of the switching elements lies within a prescribed allowable temperature range.

15. The inverter apparatus according to claim 6, wherein
the control component sets the frequency such that the temperature of the switching elements equals a lowest temperature of the prescribed allowable temperature range.

16. The inverter apparatus according to claim 2, wherein
the control component sets a frequency at which the switching elements are turned on and off during alternate execution of the first and second switching controls such that electric power supplied to the inverter from the motor due to a regeneration control of the motor to charge a battery equals an electric power lost in the inverter.

17. The inverter apparatus according to claim 2, wherein
the control component sets a frequency at which the switching elements are turned on and off during alternate execution of the first and second switching controls such that an audible frequency region is avoided.

18. A inverter apparatus comprising:
an inverter including a plurality of pairs of switching elements, each of the pairs of the switching elements being electrically connected to a direct current power source;
a rotational speed detecting component that detects a rotational speed of a motor that is electrically connected to the pairs of the switching elements; and
a control component that controls an on-off status of the switching elements to convert a direct current electric power from the direct current power source into alternating current electric power,
the control component sets the prescribed rotational speed such that as voltage of the direct current power source becomes higher, a value to which the prescribed rotational speed is set becomes larger,
the control component further alternately executing a first switching control and a second switching control upon detection of the rotational speed being larger than a prescribed rotational speed,
the first switching control turning on all of the switching elements of the pairs of the switching elements connected to a positive electrode of the direct current electric power source and turning off all of the switching elements of the pairs of the switching elements connected to a negative electrode of the direct current electric power source, and
the second switching control turning on all of the switching elements of the pairs of the switching elements connected to the negative electrode of the direct current electric power source and turning off all of the switching elements of the pairs of the switching elements connected to the positive electrode of the direct current electric power source.

19. The inverter apparatus according to claim 18, wherein
the control component alternately executes the first and second switching controls upon determining a percentage modulation, which indicates a ratio of voltage supplied to the motor with respect to a direct current voltage of the direct current power source, is higher than a prescribed percentage modulation.

20. An inverter control method comprising:
controlling on-off states of a plurality of pairs of switching elements electrically connected, respectively, to a direct current power source such that a direct current electric power from the direct current power source is converted to an alternating current electric power and supplied to a motor;
detecting a rotational speed of the motor; and
alternately executing a first switching control and a second switching during a period in which the rotational speed is detected as being larger than a prescribed rotational speed,
the executing of the first switching control being performed by turning on all of the switching elements of the pairs of the switching elements that are connected to a positive electrode of the direct current electric power source and turning off all of the switching elements of the pairs of the switching elements that are connected to a negative electrode of the direct current electric power source, and
the second switching control being performed by turning on all of the switching elements of the pairs of the switching elements that are connected to the negative electrode of the direct current electric power source and turning off all of the switching elements of the pairs of the switching elements that are connected to the positive electrode of the direct current electric power source.

* * * * *